United States Patent [19]

Huber et al.

[11] Patent Number: 4,485,709

[45] Date of Patent: Dec. 4, 1984

[54] APPARATUS FOR PUNCHING HOLES IN A MOVING STRIP

[75] Inventors: Doyle W. Huber, Kent; Richard H. Smith; Robert L. Strong, both of Auburn, all of Wash.

[73] Assignee: The Boeing Company, Seattle, Wash.

[21] Appl. No.: 380,205

[22] Filed: May 20, 1982

Related U.S. Application Data

[62] Division of Ser. No. 251,689, Apr. 6, 1981, abandoned, which is a division of Ser. No. 34,808, Mar. 30, 1979, Pat. No. 4,277,868.

[51] Int. Cl.³ .............................................. B23D 25/06
[52] U.S. Cl. ........................................ 83/324; 83/328
[58] Field of Search ................ 83/328, 327, 324, 320, 83/319

[56] References Cited

U.S. PATENT DOCUMENTS

| 2,764,238 | 9/1956 | Rusinott et al. | 83/324 |
| 3,264,920 | 8/1966 | Hallden | 83/328 X |
| 3,296,910 | 1/1967 | Haskin, Jr. et al. | 83/328 |
| 3,410,163 | 11/1968 | Taylor | 83/324 X |

Primary Examiner—Z. R. Bilinsky
Attorney, Agent, or Firm—Morris A. Case; Bernard A. Donahue

[57] ABSTRACT

A sliding block with a female die acts in conjunction with a four bar linkage mounted block with a male die to punch indexing holes in a moving metal strip. The block with male die continually seeks to rotate, but is held in position by the sliding block. The sliding block is programmed to periodically move forward at the speed of the moving metal strip and to return to starting position. This frees the male die to rotate to punch out the hole, and to continue to rotate back into the starting position to be held by the returned sliding block.

2 Claims, 14 Drawing Figures

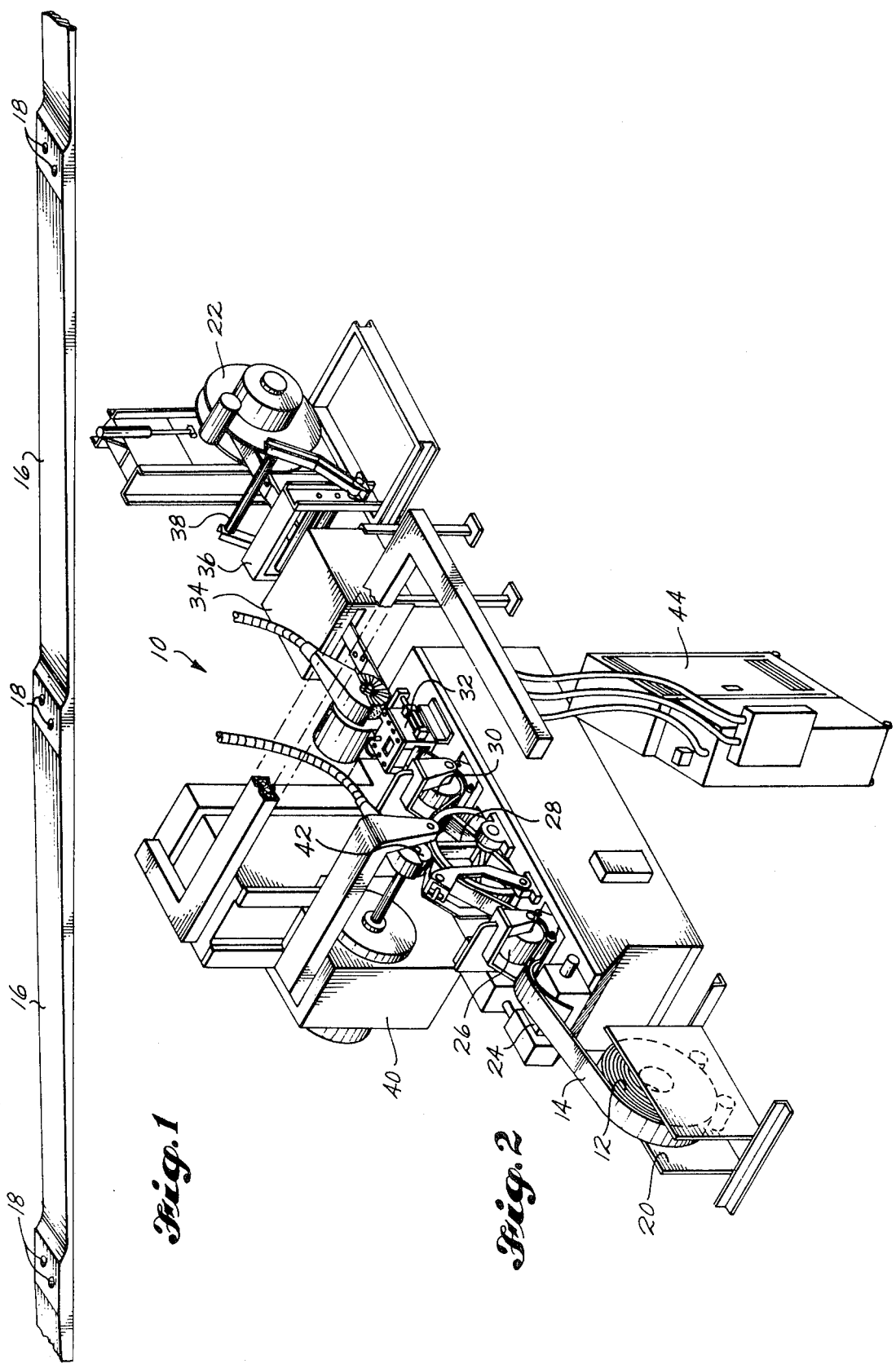

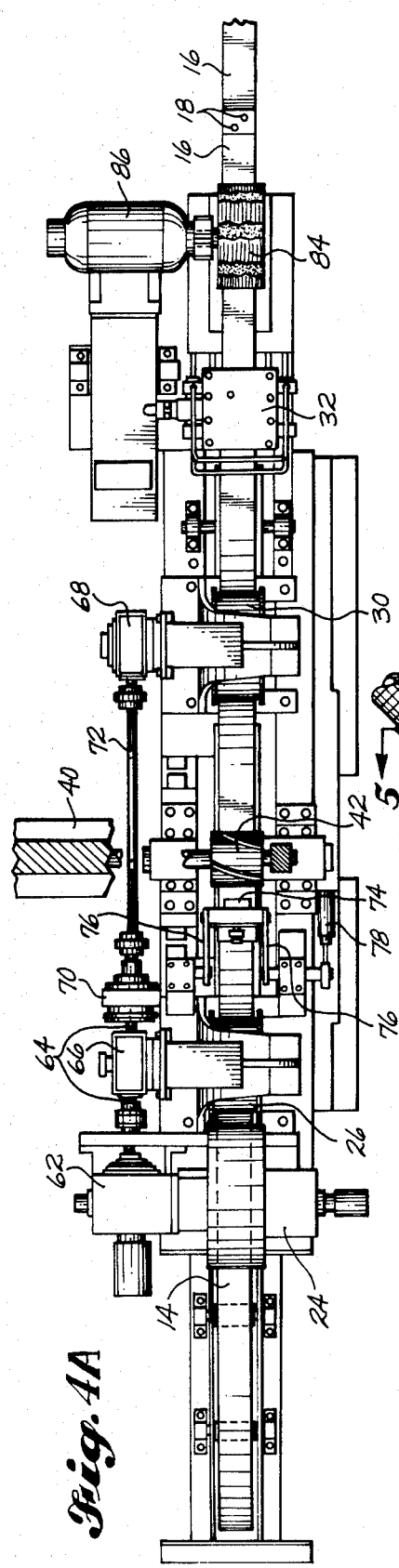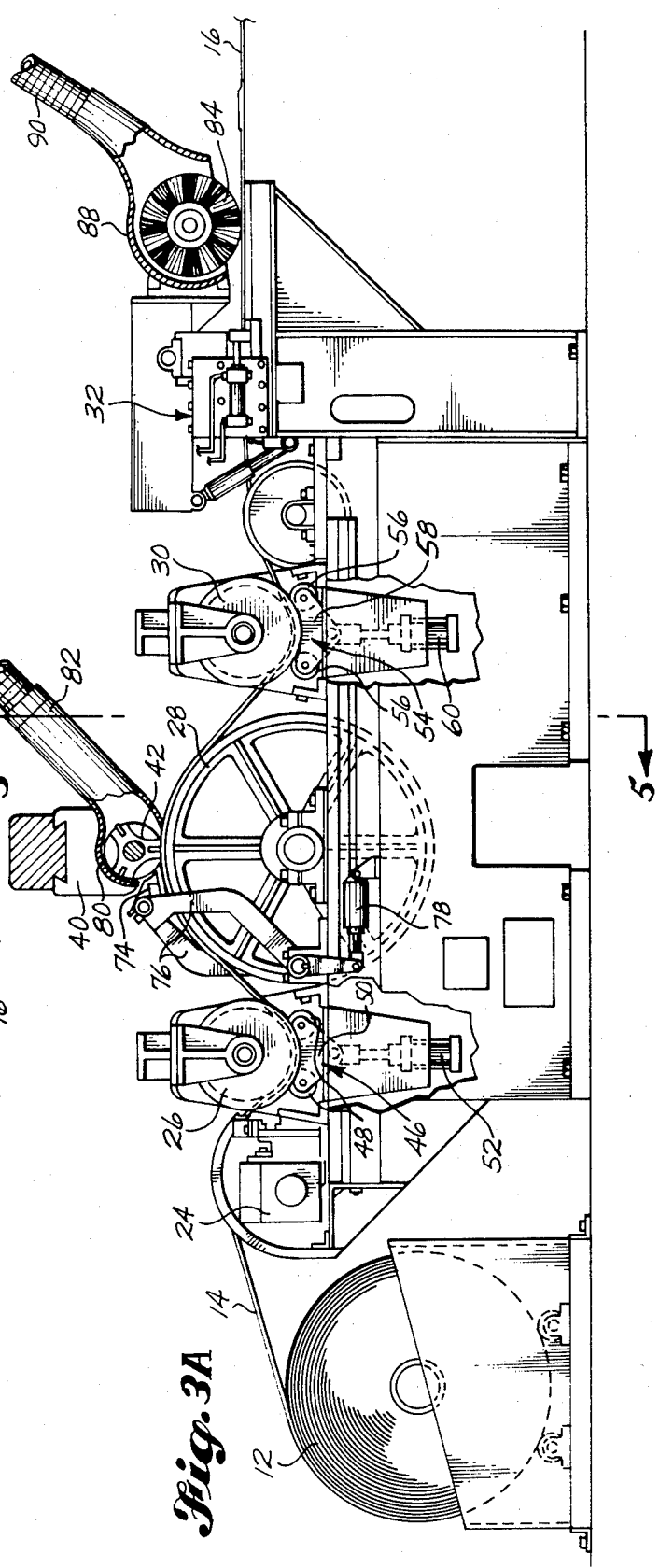

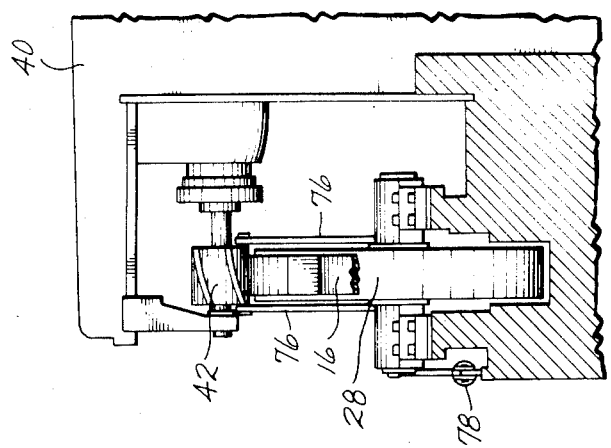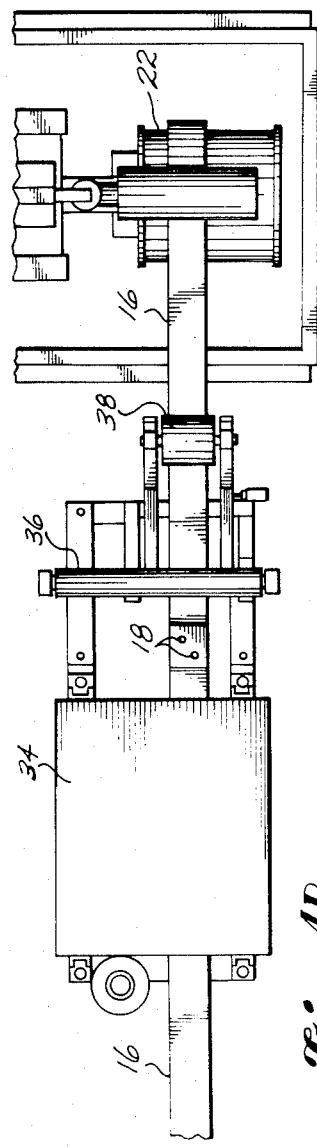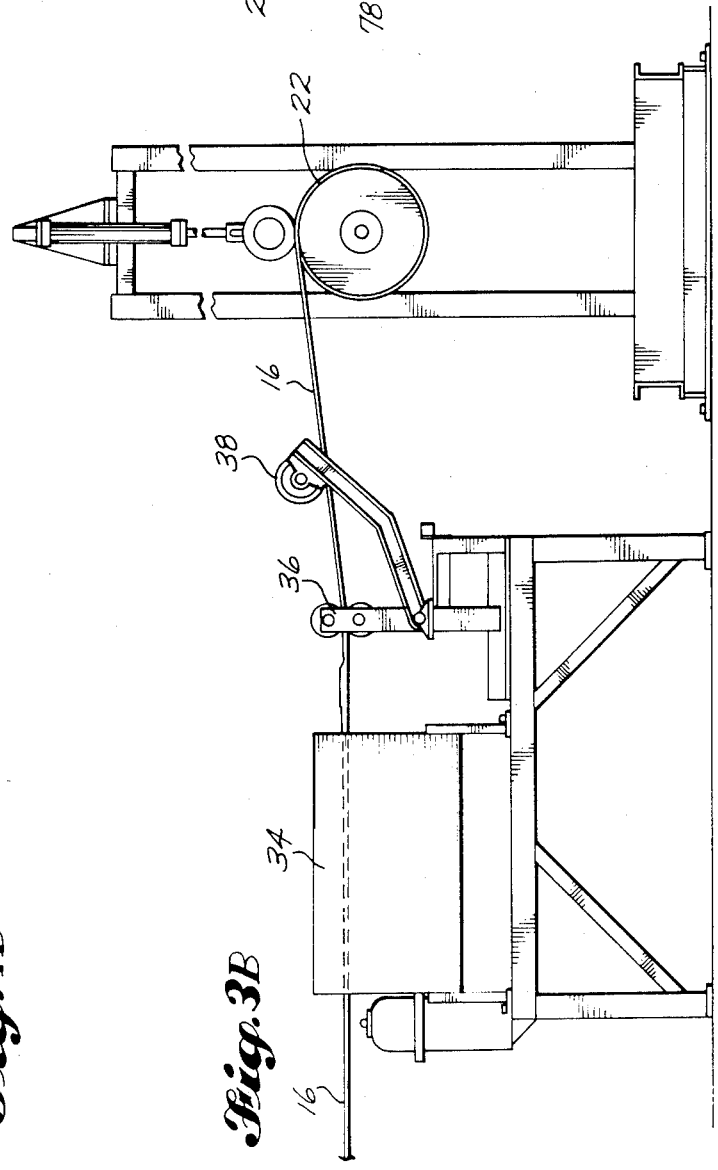

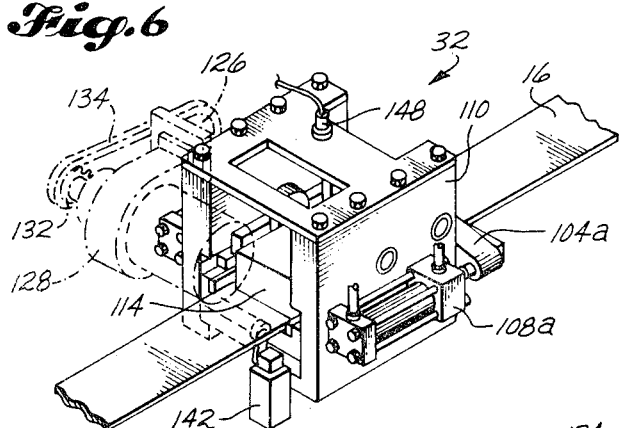
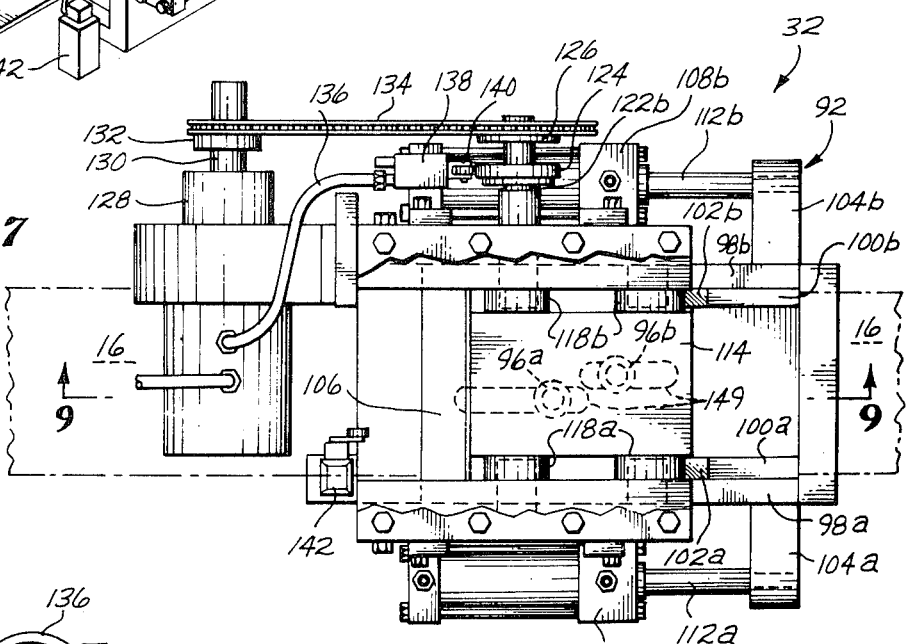
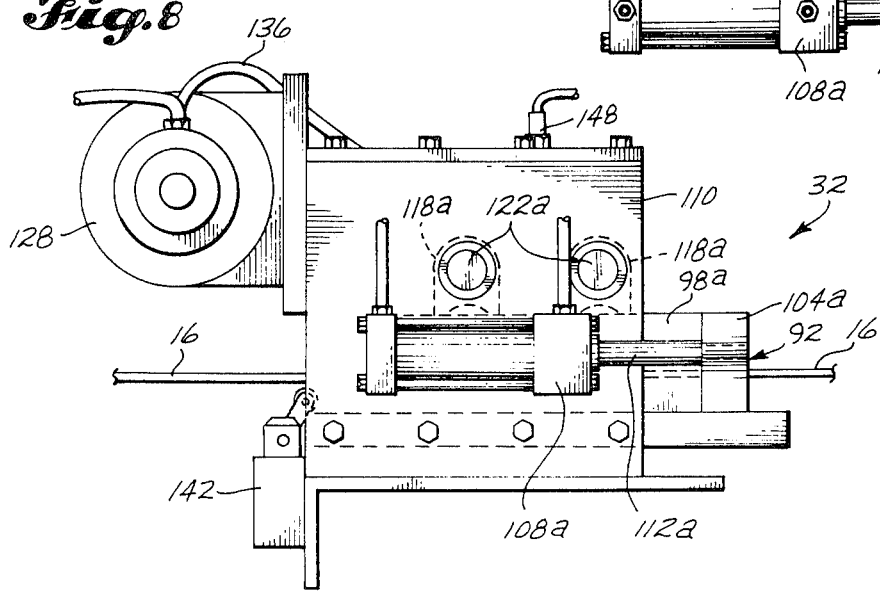

APPARATUS FOR PUNCHING HOLES IN A MOVING STRIP

This is a division of application Ser. No. 251,689, filed Apr. 6, 1981 now abandoned; which is a divisional of then copending application Ser. No. 34,808 filed Mar. 30, 1979 and now U.S. Pat. No. 4,277,868.

BACKGROUND OF THE INVENTION

Weight saving has long been an important consideration in the aircraft industry, as the weight saved gives an increase in the payload for the aircraft. One of many areas where weight can be saved lies in tapering of structural members to provide structural strength where needed while saving weight due to the tapering. Many shaped structural members are formed from a flat strip of metal that is tapered to effect a weight savings. These tapered strips have been formed in the past by placing a strip of metal on the bed of a milling cutter, holding the strip down, and passing the mill cutter head back and forth over the strip until the desired contour is obtained. This is an intermittent operation that is time consuming and costly. It has been found that a tapered strip of metal can be formed in a continuous single pass operation using the invention of this disclosure.

SUMMARY OF THE INVENTION

A drive and a tensioning wheel are located to move a strip of metal under tension over an anvil wheel. A milling cutter, programmed to move toward or away from the anvil based upon linear movement of the metal strip, contours that strip on a continuous basis as the strip passes over the anvil wheel. A punch makes a hole in the moving metal strip to provide indexing of a part in the continuous strip.

It is an object of this invention to provide continuous single pass taper milling of a metal strip.

It is another object of this invention to provide indexing of parts of the continuous metal strip.

DESCRIPTION OF THE DRAWINGS

FIG. 1 shows a tapered mtal strip formed with this invention.

FIG. 2 is a perspective view of the apparatus of this invention.

FIGS. 3A and 3B show a side elevational view, and FIGS. 4A and 4B a plan view of the apparatus of FIG. 2.

FIG. 5 is a sectional view taken along line 5—5 of FIG. 3A.

FIGS. 6, 7 and 8 show a perspective, plan and side elevational view of a punch mechanism of this invention.

DETAILED DESCRIPTION

Figure 9:
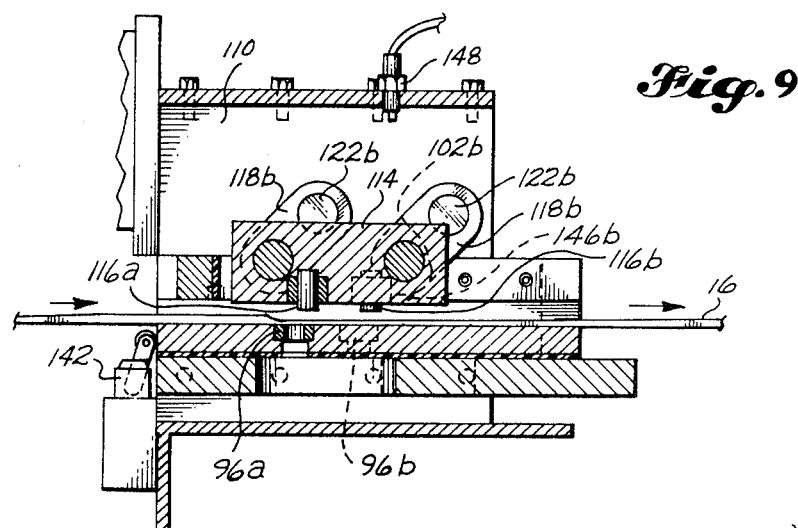
FIGS. 9, 10 and 11 are fragmented sectional views taken along line 9—9 of FIG. 7 and show various positions of a cycling punch.
Figure 10:
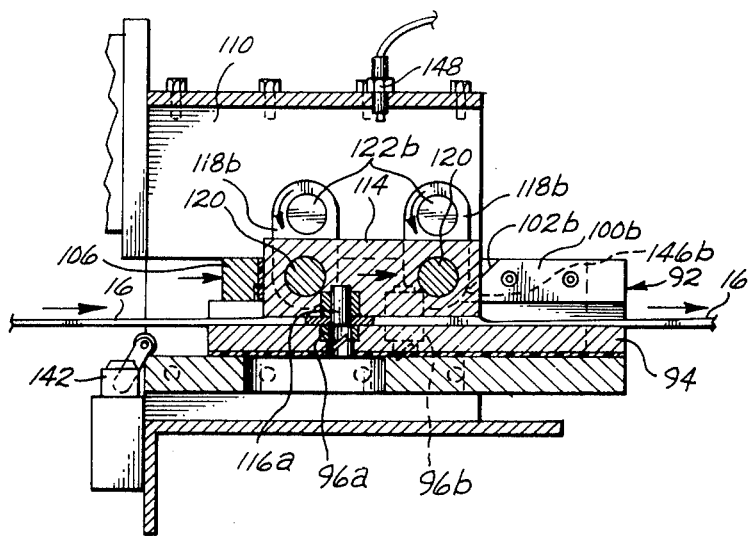
Figure 11:
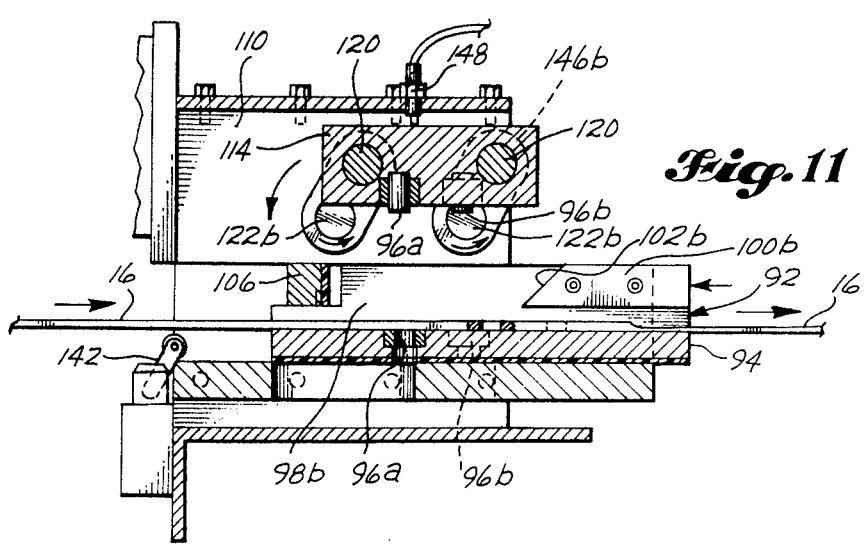
Figure 12:
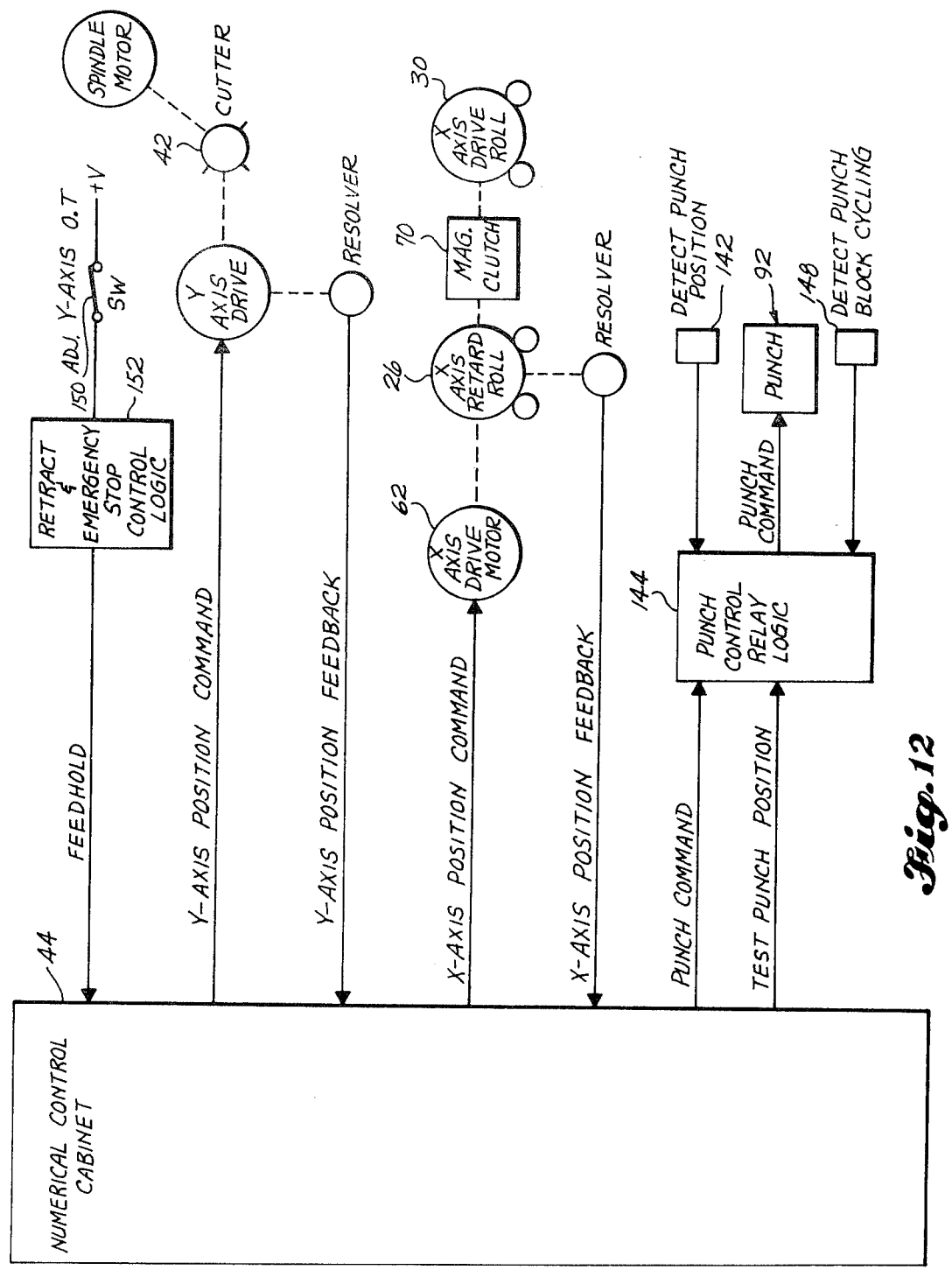
FIG. 12 shows a schematic of control apparatus for this invention.

A taper strip milling machine 10 is used to process a roll 12 of metal strip stock 14, and convert it into a roll having a series of contoured sections 16 each of which will be formed into a structured part having a tapered thickness. The strip in this embodiment has a pair of holes 18 punched by the milling machine; which will be used for indexing the part. The roll is unwound from roll holder 20, threaded through and processed in the machine and the contoured strip wound up on take up reel 22. In the machine the strip passes guide 24, retard roll 26, anvil wheel 28, drive roll 30, punch 32, oiler 34, support roll 36 and tension roll 38 before going to the take up reel 22. The strip is kept under tension as it passes over the anvil wheel and a milling spindle head 40 advances or retracts a milling cutter 42 toward and away from the anvil wheel to effect a cut on the strip as it passes by to contour the strip into sections or parts 16.

Contouring of the strip is programed from a numerical control cabinet 44 having two servo-controlled axes. The horizontal movement of the metal strip 14 over the anvil wheel is an X-axis of motion, and is only limited by the length of the roll of material 12. The vertical movement of the milling spindle head 40 referenced to the top of the anvil wheel 28 controls the height of the milling cutter above that wheel, and is the Y-axis of motion. The X-axis and the Y-axis are controlled from the numerical control cabinet with the Y-axis based on the linear movement of the metal strip or in other words the X-axis movement. The timing of actuation of the punch 32 is also programed and numerically controlled based on the linear movement of the metal strip.

Tension of the metal strip while on the anvil wheel 28 is controlled by the retard roll 26 and the drive roll 30. A pressure roll 46, as best shown in FIG. 3A, made up of a pair of rolls 48 mounted to a pivotally mounted yoke 50 is actuated by a cylinder 52 to force and hold the metal strip 14 against the retard roll to prevent slippage. A similar pressure roll 54 with rolls 56 and pivotally mounted yoke 58 is actuated by cylinder 60 to force and hold the metal strip against drive roll 30. The retard roll and the drive roll are both driven by motor 62, through common shaft 64 and gear boxes 66 and 68 respectively. The drive roll has a slightly larger diameter than the retard roll, and a magnetic clutch 70 is placed in the drive train 72 between the two gear boxes which continually places the metal strip in tension.

Even with the metal strip being under tension, if a deep cut is being milled, the cutter 42 may tend to raise the strip to give an out of tolerance contour. Pressure shoe 74, held with linkage 76, and positioned with cylinder 78 is located adjacent the cutter to hold down both edges of the strip. The pressure shoe is preferably of a modified teflon to permit slippage without scratching the surface of the metal strip.

A hood 80, around the cutter 42, leads into ducting 82, which is connected to a source of vacuum, not shown, for continuously removing chips generated by the cutter.

A burnishing wheel 84 driven by motor 86 is used for a polishing operation. Hood 88 and ducting 90 lead to a vacuum source, not shown, to remove the dust generated. Next the strip passes through oiler 34 where a film of oil is sprayed on, through support rolls 36, tension roll 38 and onto the take-up reel.

The punch 32, which is best shown in FIGS. 6 through 11, punches the indexing holes 18 as the metal strip 14 moves through the milling machine 10. The punch has two main portions. One is the drawer or sliding member 92. This member has a base 94 having a pair of female dies 96a and 96b vertically extending side members 98a and 98b each having an inwardly directed part 100a and 100b and each part having a tapered surface 102a and 102b respectively, a pair of laterally extending projections 104a and 104b, and a laterally extending drive member 106. A pair of hydraulic cylinders 108a and 108b are mounted to the sides of punch housing 110. Cylinder rods 112a and 112b are joined to the laterally extending projections to permit actuation of the sliding member. The other main portion of the punch is a punch block 114 having a pair of male dies 116a and 116b. The punch block is mounted to rotate in a complete cycle. This is accomplished with two sets of arms with a pair of arms 118a on one side of the punch block and another pair of arms 118b on the other side of the block. A pair of shafts 120 are rotatably mounted in the punch block and extend into and are joined adjacent one edge of oppositely located arms. Each arm is joined adjacent the free end to a shaft extending outwardly. These shafts are rotatably mounted to the housing 110 with shafts 122a joined to arms 118a and shafts 122b joined to arms 118b. The arms are sized and positioned to provide four bar linkage actuation of the punch block. One of the shafts 122b extends through the housing and has a cam 124 and a sprocket wheel 126 mounted on the extension. An air motor 128 with shaft 130 has a sprocket wheel 132 mounted to the shaft. A chain 134 is mounted between the two sprocket wheels to provide a drive for punch blocks 114. The air motor is energized with compressed air, from a source not shown, the air from the motor exhausts through line 136, and into normally open adjustable restrictor valve 138. As cam 124 rotates it is contacted by a cam follower 140 that controls the adjustable restrictor valve. The cam is proportioned to allow unrestricted air flow through most of a punching cycle, but to restrict air flow as the punch block 114 approaches the starting position.

The starting position for actuating the punch is as shown in FIG. 9. To actuate the punch the air motor is on and seeking to rotate the punch block. In the starting position the leading members of the arms 118a and 118b rest against and are restrained from rotating by the inclined plane surface 102a and 102b. The sliding block is fully back and against electrical switch 142; which switch signals the punch is in position and ready to be actuated. The signal feeds into punch control relay logic 144, the numerical control unit 44 checks and finds the punch is in position, sends a command signal and the punch is actuated. To accomplish the actuation the hydraulic cylinders 108a and 108b are actuated and sliding block 92 is moved forward. As the stop surface 102a and 102b advance the arms contacting those surfaces are rotated by the air motor and the dies 116a and 116b contact but do not penetrate the metal strip as the sliding block continues to advance the following transverse drive bar 106 contacts the punch block 114 driving it forward and punching the metal strip. Upon further advance by the sliding block the rounded ends 146a and 146b on the arms slide past the inclined stop surface, the punch block rapidly rotates upward and actuates proximity switch 148. This initiates a signal which is used to reverse the fluid to the cylinders and return the sliding block to starting position. Shortly after the punch block passes the proximity switch cam 124 acts on cam follower 140 restricting flow through valve 138 and the punch block slowly returns to starting position while allowing the sliding block to first return to starting position. The punched blanks are removed through slots 149 located in housing 110.

A limit switch 150 is used to limit the travel of the cutter toward the anvil wheel 28. When the limit of travel is reached and the limit switch is contacted, it activates a control logic 152 which retracts the cutter spindle head 40 and shuts down the machine.

In operation a tape for the numerical control cabinet 44 is programed to provide the desired X-axis travel to make the part, to determine the Y-axis travel of the milling cutter 42 based on the X-axis travel, and to determine the timing for the punch based on the X-axis travel. The strip of metal 14 stock is threaded under the retard roll 26, over the freely rotatable anvil wheel 28, under the drive roll 30, through the punch 32 and onto the take up roll 22. Pressure rolls 46 and 50 are actuated to press against retard and drive rolls respectively and the machine initiated to mill and roll up the parts.

We claim:

1. An apparatus for punching holes in a moving metal strip comprising: a housing, a slide block having a female die, an incline plane surface located on the slide block to provide a stop surface, a punch block having a male die, a four bar linkage to extend between the housing and the punch block to allow rotation of the punch block and the linkages located in starting position to contact the stop surface means for advancing the slide block with stop surface in syncronism with the travel of a metal strip to be punched, pneumatic means for continually seeking to rotate the punch block, means for providing auxiliary power for driving the punch block during actual punching, means for moving the slide block back to starting position, and means for timing rotation of the punch block for permitting the slide block to be in starting position before the punch block returns.

2. An apparatus as in claim 1 wherein the means for providing auxiliary power for driving the punch block comprises a transverse drive member on the sliding block located to contact and move against the punch block as the sliding block advances.

* * * * *